UNITED STATES PATENT OFFICE.

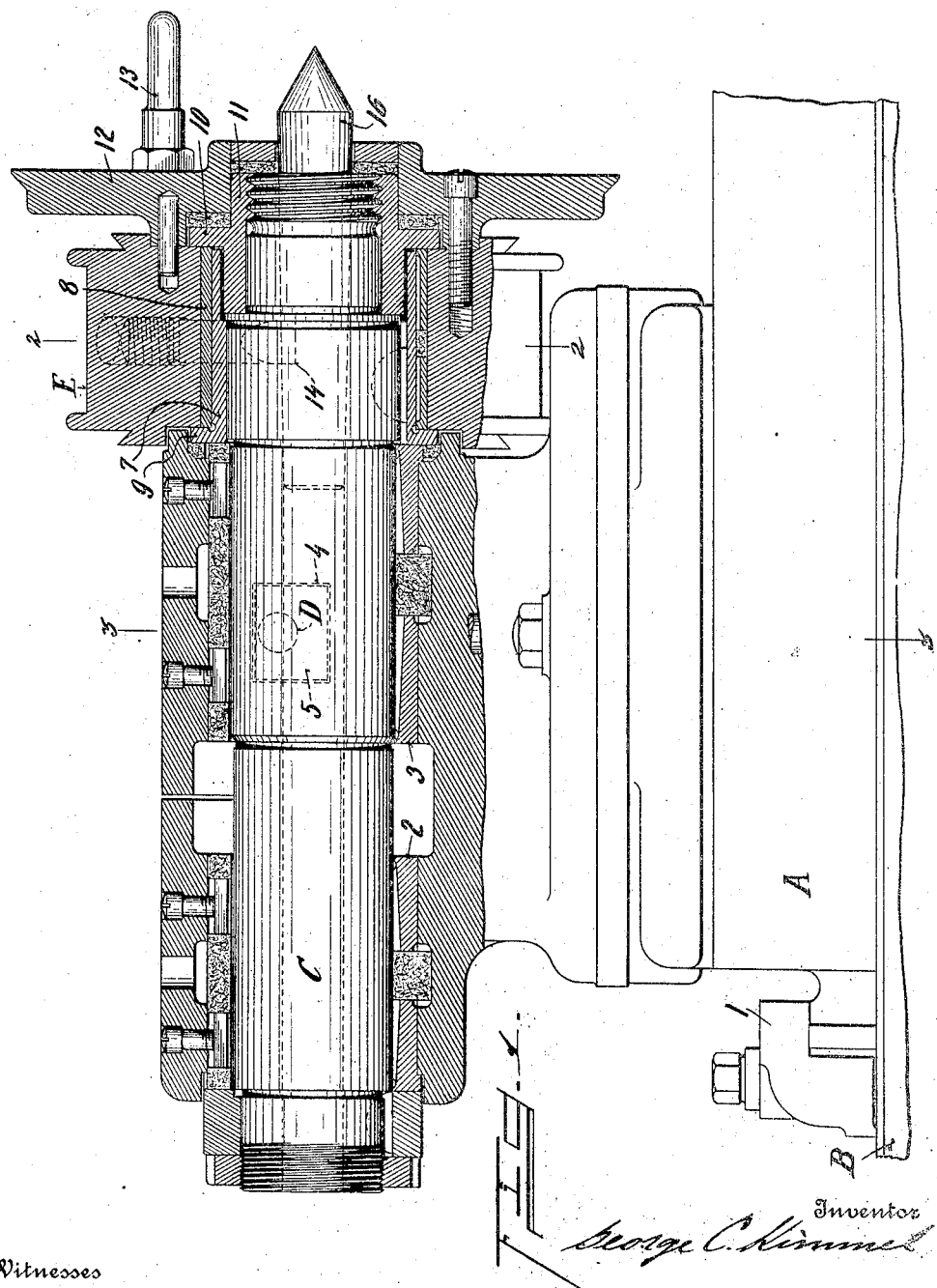

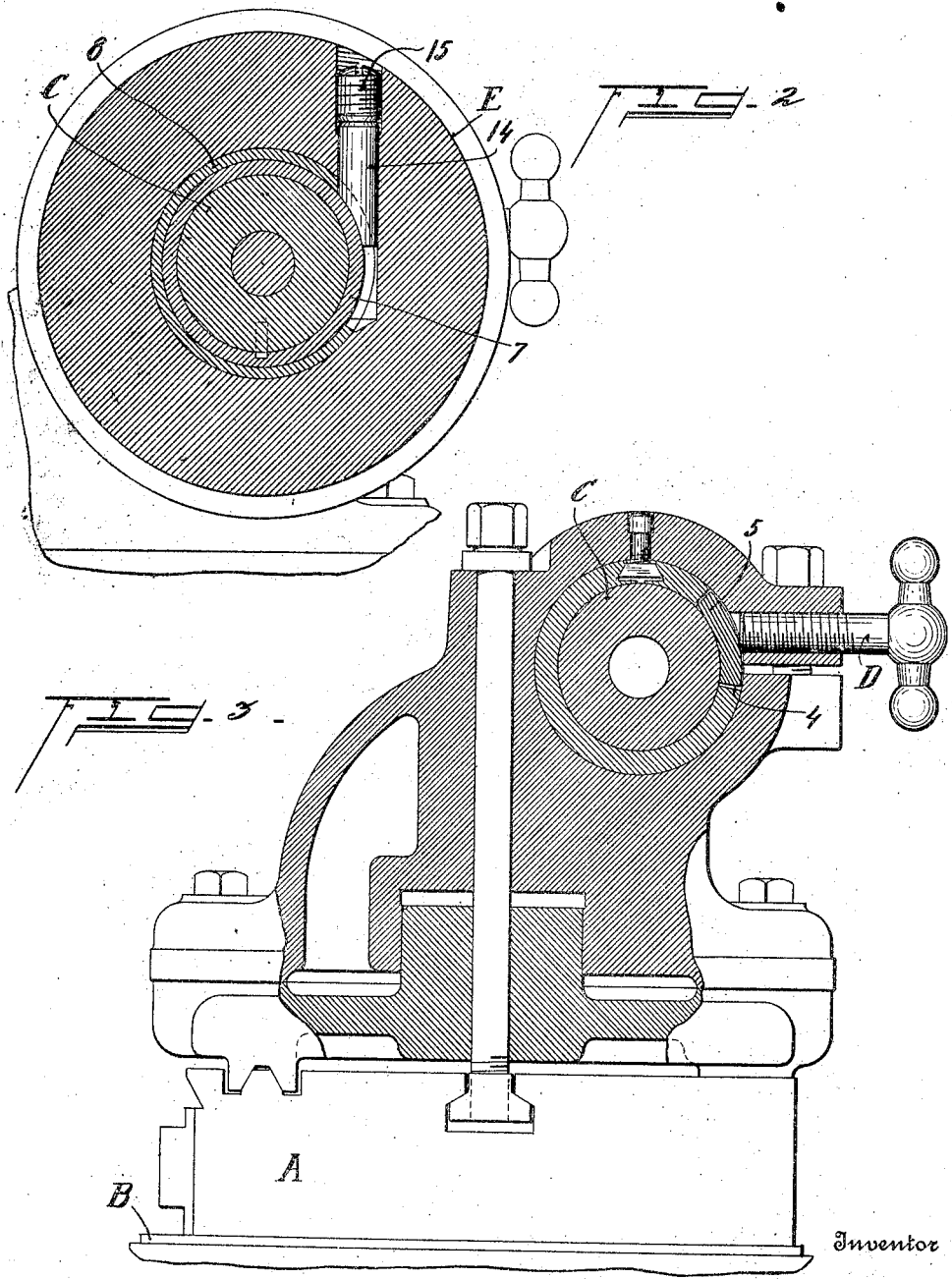

GEORGE C. KIMMEL, OF CINCINNATI, OHIO, ASSIGNOR TO THE CINCINNATI GRINDER COMPANY, OF CINCINNATI, OHIO, A CORPORATION OF OHIO.

HEAD-STOCK FOR GRINDERS.

1,102,417.

Specification of Letters Patent.   Patented July 7, 1914.

Application filed January 17, 1914. Serial No. 812,671.

*To all whom it may concern:*

Be it known that I, GEORGE C. KIMMEL, a citizen of the United States, and residing at Cincinnati, in the county of Hamilton and State of Ohio, have invented a new and Improved Head-Stock for Grinders, of which the following specification is a full disclosure.

My invention pertains to head-stocks for machine tools and relates more particularly to head-stocks of the type usually employed in grinding machines.

One of the objects of this invention is to provide means for rendering the spindle active or inactive relative to the head-stock.

Another object is to provide a drive pulley on the spindle adapted to have secured thereto a removable face plate.

Another object is to provide means for locking the pulley to the spindle.

Other novel features of construction and arrangement of parts are made apparent by the accompanying drawings, which, while illustrating a preferred form of embodiment of this invention are only intended to present to those skilled in this art, the underlying principles thereof, that they may employ them in the numerous modifications contemplated within their scope. These drawings have been annexed as a part of this disclosure, like characters of reference denoting corresponding parts throughout the several figures, of which:—

Figure 1 is a side elevation, partly in section, of my improved head-stock. Fig. 2 is a section on line 2—2, Fig. 1. Fig. 3 is a section on line 3—3, Fig. 1.

Continuing now, to describe the illustrated adoption of this invention, it may be preliminarily stated that the head-stock base A is secured to the reciprocating table B, by one or more clamps 1, and while I have shown this invention as applied to a universal head-stock, it is obvious that it may just as efficiently be applied to a solid head-stock. The hollow spindle C is rotatably journaled within sleeves 2, 3, which may be provided with alining and lubricating means of any desired form. The sleeve 3 is apertured at 4 and in such aperture is positioned a shoe 5 which is adapted to be clamped against the periphery of the spindle by a hand screw D screw threaded in the spindle housing, thereby locking said spindle against rotation. A sleeve 7 is keyed to the forward overhanging end of the spindle and rotates therewith as a unit. Journaled on said sleeve and provided with a lubricated anti-friction bushing 8 is a belt pulley E, which is confined between an annular flange 9 of the sleeve 7 and an annular flange 10 formed on a retaining sleeve 11 screw threaded on the end of the spindle. A face plate 12 is secured to the pulley and is provided with a work-engaging stud 13. To lock the pulley to the sleeve 7 and consequently to the spindle by reason of its connection therewith, I provide a cylindrical shoe 14 positioned in an aperture in the pulley and through its bushing 8 and adapted to be clamped against the sleeve 7 by a screw 15, screw threaded in said aperture. The end of the aperture in the spindle C is tapered to receive a standard taper shanked center 16 or a taper shanked chuck as the character of the work may require.

With some classes of work it is desirable to use an internally threaded chuck which may be screwed on the end of spindle in place of the sleeve 11 after first removing said sleeve and the face plate. By this construction it is possible to have an active or "live" spindle or an inactive or "dead" spindle and also a "live" face plate in direct connection with the driving pulley without the use of gearing.

This head-stock construction and the principle of spindle control, has particular utility in the instance of grinding machines. The head stock proper has the circumferential spindle bearings in which the spindle may be friction clamped to provide a feed center. The spindle projects beyond these circumferential bearings, and this projecting end and the driving wheel are supported between end bearings which are grit and dust-proof, and this end of the spindle can be friction clamped concentrically to the driving wheel to constitute the live center, with the use of a single head-stock driving pulley wheel.

Having described my invention, I claim:—

A head-stock for machines of the class described, comprising a head-stock portion formed with circumferential bearings, a spindle journaled therein and having its forward end projected beyond said head-stock portion, a driving wheel having circumferential bearings on said extended end of the spindle, and endwise bearings against the said head-stock portion, a friction clamp on said head-stock portion for holding said spindle against rotation in its bearings, a second friction clamp intermediate the driving wheel and its spindle bearings, for fixing the spindle to the driving wheel, and a work support on the spindle end adjacent the outer face of the driving wheel.

In witness whereof, I hereunto subscribe my name, as attested by the two subscribing witnesses.

GEORGE C. KIMMEL.

Witnesses:
OLIVER B. KAISER,
LOUISE A. BECK.